United States Patent [19]
Kunimitsu et al.

[11] Patent Number: 5,570,672
[45] Date of Patent: Nov. 5, 1996

[54] FUEL EVAPORATIVE EMISSION TREATMENT SYSTEM

[75] Inventors: Masafumi Kunimitsu; Kiyoshi Mori; Tomokazu Muraguchi, all of Okazaki; Yoichiro Ando, Seto, all of Japan

[73] Assignee: Mitsubishi Jidosha Kogyo Kabushiki Kaisha, Tokyo, Japan

[21] Appl. No.: 508,560

[22] Filed: Jul. 28, 1995

[30] Foreign Application Priority Data

Jul. 28, 1994 [JP] Japan ................................. 6-176975
Mar. 13, 1995 [JP] Japan ................................. 7-052794
Jun. 15, 1995 [JP] Japan ................................. 7-149204

[51] Int. Cl.⁶ .................................................. F02M 25/08
[52] U.S. Cl. .......................... 123/516; 137/587; 141/59
[58] Field of Search .................................. 123/516, 518, 123/519; 137/587, 588; 141/59, 60, 61; 251/61.5

[56] References Cited

U.S. PATENT DOCUMENTS

| | | | |
|---|---|---|---|
| 4,762,156 | 8/1988 | Rich | 141/59 |
| 5,054,528 | 10/1991 | Saitoh | 137/587 |
| 5,244,022 | 9/1993 | Gimby | 137/587 |
| 5,282,497 | 2/1994 | Allison | 141/59 |
| 5,299,605 | 8/1994 | Bergamini et al. | 137/587 |
| 5,335,638 | 8/1994 | Mukai | 123/516 |
| 5,431,199 | 7/1995 | Benjay et al. | 141/59 |
| 5,456,238 | 10/1995 | Horiuchi et al. | 137/587 |

FOREIGN PATENT DOCUMENTS 2102822  4/1990  Japan .

*Primary Examiner*—Thomas N. Moulis
*Attorney, Agent, or Firm*—Birch, Stewart, Kolasch & Birch, LLP

[57] ABSTRACT

A fuel evaporative emission treatment system installed in an engine fuel system has a canister for adsorbing evaporative fuel, a vent hose connecting a fuel tank and the canister, and a vent circulation hose connecting the vent hose and a filler neck of the fuel tank, and the sectional areas of the vent hose and vent circulation hose are set so that the ratio thereof may be a proper value. The negative pressure produced in the filler neck due to aspiration induced by refueling is canceled out by the pressure of fuel gas circulated to the filler neck through the vent circulation hose, whereby the internal pressure of the filler neck is controlled to a value appropriately smaller than the atmospheric pressure. Thus, inflow of the outside air into the filler neck, and thus generation of evaporative fuel gas, can be suppressed, and also the outflow of evaporative fuel gas from the filler neck is suppressed.

20 Claims, 7 Drawing Sheets

FUEL EVAPORATIVE EMISSION TREATMENT SYSTEM

BACKGROUND OF THE INVENTION

1. Field of the Invention

The present invention relates to a fuel evaporative emission treatment system for preventing evaporative fuel from dissipating into the atmosphere from an engine fuel system.

2. Description of the Related Art

Engines installed in motor vehicles and the like emit harmful substances such as carbon monoxide, nitrogen oxides and hydrocarbons. For example, unburned hydrocarbon (HC) gas contained in blowby gas or in exhaust gas is emitted to the atmosphere, and also evaporative fuel gas produced in the fuel tank and containing HC as its main component is dissipated into the atmosphere. Motor vehicles are, therefore, equipped with systems for suppressing the emission of harmful substances, such as a blowby gas recirculation system, an exhaust gas purification system, a fuel evaporative emission treatment system, and an ORVR (Onboard Refueling Vapor Recovery) system. Further, in some gas stations, a special refueling system capable of sucking in evaporative fuel is installed in order to suppress the emission of harmful substances.

The fuel evaporative emission treatment system serves to prevent evaporative fuel from dissipating into the atmosphere from the fuel tank, and typically comprises a canister 6 having an adsorbent such as activated charcoal 8 filled in a container 7 thereof for adsorbing HC components in the evaporative fuel, as shown in FIG. 1. The container 7 has an inlet port 7a communicating with a fuel tank 1, an outlet port 7b communicating with the suction pipe of an engine, and a vent port 7c opening to the atmosphere. In this canister storage-type fuel evaporative emission treatment system, when the engine is at rest, evaporative fuel gas is introduced into the canister 6 through a vent hose 5 and HC components in the gas are adsorbed by the activated charcoal 8. When the engine is operated thereafter, the negative pressure of suction air produced in the suction pipe acts upon the outlet port 7b, permitting purge air to be introduced through the vent port 7c. Consequently, the HC components of evaporative fuel gas adsorbed by the activated charcoal 8 are separated therefrom by the purge air, and the separated HC components are discharged into the suction pipe together with the purge air. The HC components thus discharged into the suction pipe burn together with air-fuel mixture in engine cylinders, thus preventing the emission of evaporative fuel into the atmosphere.

In FIG. 1, reference numeral 3 denotes a fuel-cut valve for preventing the oversupply of fuel to the fuel tank 1, 4 denotes a rollover valve for preventing the leak of fuel from the fuel tank 1 in case of rollover of the motor vehicle, and 9 denotes a two-way valve arranged in a vent hose 5' extending between the fuel tank 1 and an intermediate portion of the vent hose 5. If evaporation of fuel takes place in the fuel tank 1 while the fuel-cut valve 3 is closed, the internal pressure of the fuel tank rises. In this case, the two-way valve 9 opens and permits the evaporative fuel to be discharged to the canister 6 through the vent hoses 5' and 5.

When fuel is supplied to the fuel tank 1 from a feed gun 10 inserted into a filler neck 2, negative pressure is produced inside the filler neck 2 due to aspiration (suction) induced by the discharge of fuel from the feed gun 10. Consequently, the outside air is drawn into the filler neck 2 through the gap between the filler neck 2 and the feed gun 10. The outside air then flows into the fuel tank 1 together with fuel discharged from the feed gun 10. The air thus introduced accelerates the evaporation of fuel in the fuel tank 1 and increases the quantity of evaporative fuel gas in the tank 1.

If a quantity of evaporative fuel gas exceeding the HC adsorption capacity of the canister 6 is introduced into the canister 6, HC components in the evaporative fuel gas that are not adsorbed by the canister 6 are dissipated into the atmosphere through the vent port 7c.

In order to prevent the dissipation of increased evaporative fuel, the canister capacity may be increased so that it can cope with an increase in the quantity of evaporative fuel caused by the inflow of air. However, a large-capacity canister takes up a large installation space and is heavy in weight, which is not preferable from the viewpoint of downsizing and weight reduction of motor vehicles. Also, large-sized canisters may not conform to certain regulations regarding the prevention of dissipation of evaporative fuel. Further, if a large-sized canister is used, an increased quantity of HC components in evaporative fuel is introduced into the engine from the canister. This makes the air-fuel ratio control on the engine side difficult and also imposes a severer burden on the exhaust gas purification measures.

To eliminate the drawbacks, the gap between the filler neck and the feed gun may be closed by a seal section arranged at the filler neck, to thereby prevent or reduce the flow of air into the fuel tank during refueling, as proposed in Unexamined Japanese Patent Publication No. 2-102822. However, the seal used in this type of system must be made of an elastic member etc. having fuel resistance because it is brought into close contact with the outer surface of the feed nozzle, increasing the cost. Further, since the feed nozzle is inserted into the seal section each time fuel is supplied, the sealing performance lowers after long use.

The ORVR system serves to prevent the dissipation of evaporative fuel gas from the fuel tank, and has a fuel trap 2c in the filler neck 2, as shown in FIG. 2. The fuel trap 2c is formed by concavely bending an end portion of the filler neck 2 located inside the fuel tank 1. The fuel trap 2c is located at a lower level than a fuel outlet opening 2b of the filler neck 2; therefore, fuel remains in the trap 2c even when the level of the fuel in the fuel tank 1 becomes lower than the fuel outlet opening 2b. Namely, fuel always exists in the fuel trap 2c, and the trapped fuel serves to block the communication between the fuel tank 1 and the outside of the same via the filler neck 2 at all times. Accordingly, even when a fuel inlet opening 2a of the filler neck 2 is opened at the time of re-fueling, the evaporative fuel gas in the upper space of the fuel tank 1 above the fuel level is never dissipated into the atmosphere through the filler neck 2.

However, also in the fuel tank equipped with the ORVR system, if the outside air is drawn through the filler neck 2 into the fuel tank 1 during refueling, the quantity of evaporative fuel gas in the fuel tank 1 increases due to the inflow of air. Accordingly, in the event a quantity of evaporative fuel gas exceeding the adsorption capacity of the canister 6 is introduced into the canister 6, the evaporative fuel gas is dissipated into the atmosphere through the canister 6.

The refueling system having the function of sucking in evaporative fuel is intended to prevent evaporative fuel gas from being discharged into the atmosphere from the fuel tank during refueling. As shown in FIG. 3, this refueling system includes a feed gun 10, a double pipe-type fuel feed hose 111, a fuel storage tank 112, and a bellows-type suction duct 113. The suction duct 113 is attached to the feed gun 10 so as to surround a feed nozzle 10a of the gun 10. When the feed nozzle 10a is inserted into the filler neck 2, the fuel inlet opening 2a of the filler neck 2 is hermetically closed by the suction duct 113. While in this state, the refueling system is operated, whereupon fuel in the fuel storage tank 112 is introduced to the feed nozzle 10 through the inner tube of the fuel feed hose 111, and then is supplied from the nozzle 10a into the fuel tank 1 through the filler neck 2. On the other hand, the evaporative fuel gas in the fuel tank 1 is drawn by suction into the fuel storage tank 112 through the filler neck 2, the gap between the feed nozzle 10a and the suction duct 113, and the outer tube of the fuel feed hose 111. Consequently, the dissipation of evaporative fuel gas from the fuel tank 1 into the atmosphere is prevented.

Some refueling systems having the above evaporative fuel suction function are associated with an autostop mechanism for preventing the oversupply of fuel. The autostop mechanism is designed to automatically stop the supply of fuel when a detection hole 10b formed in the feed nozzle 10a is submerged in fuel.

The refueling system having both the evaporative fuel suction function and the automatic fuel supply stopping function can sometimes automatically stop the fuel supply while fuel is supplied to the fuel tank, though the stop of fuel supply is actually not required. Namely, in this refueling system, an excessive negative pressure can be produced within the filler neck 2 in the vicinity of the feed nozzle 10a. In such cases, fuel flows back toward the feed nozzle 10a and enters the detection hole 10b, actuating the autostop mechanism.

To eliminate the disadvantage, a fuel tank apparatus is proposed in Unexamined Japanese Patent Publication No. 2-102822 wherein a branch vent tube diverging from a vent tube (corresponding to the element 5 in FIGS. 1 and 2) is connected to the fuel inlet side of the filler neck, and a solenoid valve, which opens during refueling, is arranged in the branch vent tube. During refueling, the evaporative fuel gas in the fuel tank is introduced into the filler neck through the branch vent tube so that the internal pressure of the filler neck in the vicinity of the feed nozzle may be increased to thereby prevent undesired actuation of the autostop mechanism. In this proposed apparatus, however, the internal pressure of the filler neck occasionally rises to a level considerably higher than the atmospheric pressure. If the pressure within the filler neck increases to such high level while fuel is supplied from a normal refueling system having no evaporative fuel suction function, a significant quantity of the evaporative fuel gas introduced into the filler neck via the branch vent tube is dissipated into the atmosphere through the gap between the filler neck and the feed gun.

Therefore, in the proposed apparatus, a seal section for preventing the dissipation of evaporative fuel gas is arranged in the filler neck at a location upstream of the position where the branch vent tube opens into the filler neck. However, seals excellent in both fuel resistance and airtightness are expensive, and the sealing performance lowers after long use, causing leak of the evaporative fuel.

SUMMARY OF THE INVENTION

It is an object of the present invention to provide a fuel evaporative emission treatment system capable of reducing the dissipation of evaporative fuel from a fuel tank into the atmosphere during refueling.

Another object of the present invention is to provide a fuel evaporative emission treatment system in which the quantity of the outside air flowing into the fuel tank through a filler neck during refueling is lessened to thereby reduce the quantity of evaporative fuel produced within the fuel tank.

Still another object of the present invention is to provide a fuel evaporative emission treatment system of which the canister can be reduced in size.

A further object of the present invention is to provide a fuel evaporative emission treatment system which requires no seal for closing the gap between the filler neck and a feed gun.

Yet another object of the present invention is to provide a fuel evaporative emission treatment system which is simple in structure and inexpensive.

According to a first aspect of the present invention, there is provided a fuel evaporative emission treatment system for use with an engine fuel system including a fuel tank having a filler neck, the fuel tank having an upper space defined therein above the level of fuel contained therein. The system comprises a canister for adsorbing evaporative fuel produced in the fuel system; a vent passage connecting the upper space of the fuel tank and the canister; and a vent circulation passage connecting the upper space of the fuel tank and the filler neck. The vent passage and the vent circulation passage have first and second effective areas, respectively, and the ratio of the second effective area to the first effective area is set to a value such that the internal pressure of the filler neck during refueling falls within a predetermined pressure range. The second effective area is smaller than the first effective area.

The fuel evaporative emission treatment system according to the first aspect of the invention is advantageous in that, during refueling, a proper quantity of evaporative fuel is circulated from the upper space of the fuel tank to the filler neck through the vent circulation passage, to thereby apply suitable positive pressure to the interior of the filler neck by means of the circulated evaporative fuel. The pressure of the circulated evaporative fuel cancels out to a considerable degree the negative pressure (hereinafter referred to as the "aspiration-induced negative pressure") produced within the filler neck due to aspiration induced by refueling, and thus the internal pressure of the filler neck during refueling is controlled to a proper value falling within the predetermined pressure range.

Since the internal pressure of the filler neck is controlled to a proper value, the outflow of the circulating evaporative fuel to the atmosphere through the gap between the feed gun and the filler neck is suppressed. Most of the circulating evaporative fuel flows into the fuel tank together with fuel supplied from the feed gun. It is, therefore, not essential to close the gap between the feed gun and the filler neck with a seal member. It is to be noted in particular that, since the internal pressure of the filler neck during refueling is controlled to a proper value, the quantity of the outside air sucked into the filler neck through the gap between the feed gun and the filler neck and flowing into the fuel tank during refueling is reduced. This suppresses the increase of evaporative fuel attributable to the inflow of air.

Thus, the quantity of evaporative fuel produced in the fuel tank is reduced, and also part of the evaporative fuel in the fuel tank is circulated to the filler neck; therefore, the quantity of evaporative fuel introduced into the canister from the fuel tank is reduced. Accordingly, the evaporative fuel adsorption capacity required of the canister is lessened, making it unnecessary to use a large-capacity canister.

Namely, according to the present invention, the dissipation of evaporative fuel into the atmosphere from the fuel tank can be reduced with the use of a small-sized canister.

Further, the system of the present invention is simple in structure and can be manufactured at low cost. For example, it is not necessary to use a seal member for closing the gap between the feed gun and the filler neck. Furthermore, in the system of the present invention, no excessive negative pressure is produced inside the filler neck, and therefore, the situation where the fuel supplied from the feed gun flows backward within the filler neck does not occur. Accordingly, even in the case of refueling from a feed gun having the autostop mechanism, there is no possibility of the autostop mechanism operating erroneously due to backward flow of fuel, thus permitting smooth refueling.

According to a second aspect of the present invention, there is provided a fuel evaporative emission treatment system having a basic arrangement identical to that of the system according to the first aspect of the invention. This system comprises an orifice formed in the vent circulation passage for reducing the effective area thereof. The vent passage has a first effective area, and a portion of the vent circulation passage at which the orifice is formed has a second effective area. The ratio of the second effective area to the first effective area is set to a value such that the internal pressure of the filler neck during refueling falls within a predetermined pressure range.

The fuel evaporative emission treatment system according to the second aspect of the invention has the same advantages as those obtained by the system according to the first aspect of the invention. Namely, the dissipation of evaporative fuel during refueling is prevented, the canister is reduced in size, the cost of the system is cut down, the need for the seal member is eliminated, and smooth refueling from a feed gun having the autostop mechanism is ensured.

In the system according to the second aspect of the invention, the second effective area is preferably smaller than the first effective area, and in this case, the internal pressure of the filler neck during refueling is controlled to a proper value.

Preferably, in the fuel evaporative emission treatment systems according to the first and second aspects of the invention, the second effective area is made to be smaller than the effective area of the gap between the filler neck and the feed gun inserted into the filler neck, or the first effective area is made to be greater than the sum of the second effective area and the effective area of the gap between the filler neck and the feed gun inserted into the filler neck. In this case, a proper relationship can be established between the quantity of evaporative fuel circulated from the fuel tank to the filler neck through the vent circulation passage, the quantity of evaporative fuel introduced into the canister from the fuel tank, and/or the inflow quantity of the outside air (aspiration-induced negative pressure) during refueling, thus permitting the internal pressure of the filler neck to be controlled to a proper value during refueling.

Preferably, in the fuel evaporative emission treatment systems according to the first and second aspects of the invention, the ratio of the second effective area to the first effective area is set to a value such that the internal pressure of the filler neck during refueling is close to or smaller than the atmospheric pressure, or such that the internal pressure of the filler neck during refueling is close to and at the same time smaller than the atmospheric pressure. In this case, the outflow of the evaporative fuel, circulated to the filler neck from the fuel tank, into the atmosphere is suppressed or prevented, and also the quantity of the outside air sucked into the filler neck during refueling is reduced.

In the fuel evaporative emission treatment systems according to the first and second aspects of the invention, preferably, the second effective area is set to a value such that the flow rate of air sucked in from the gap between the filler neck and the feed gun is close to or greater than zero during refueling at a minimum fuel feed rate, or such that the flow rate of air sucked in from the gap is close to and at the same time greater than zero during refueling at the minimum fuel feed rate. In this case, even when fuel is supplied at low feed rate, intake of the outside air into the filler neck is suppressed or prevented, and also the outflow of evaporative fuel into the atmosphere is suppressed or prevented. Accordingly, the dissipation of evaporative fuel can be reliably reduced even during refueling at low fuel feed rate.

According to a third aspect of the present invention, there is provided a fuel evaporative emission treatment system having a basic arrangement identical to that of the systems according to the first and second aspects of the invention. This system comprises a control valve arranged in the vent circulation passage for varying the effective area thereof.

In the fuel evaporative emission treatment system according to the third aspect of the invention, the quantity of evaporative fuel circulated from the fuel tank to the filler neck through the vent circulation passage during refueling is controlled to a proper value by the control valve. Thus, the system according to the third aspect of the invention can prevent the dissipation of evaporative fuel during refueling, permit reduction in size of the canister, cut down the cost of the system, eliminate the need for the seal member, and allow smooth refueling from a feed gun having the autostop mechanism, like the systems according to the first and second aspects of the invention.

Preferably, in the system according to the third aspect of the invention, the control valve increases or decreases the effective area of the vent circulation passage in accordance with the internal pressure of the filler neck at a location close to the position at which the vent circulation passage opens into the filler neck. In this case, the quantity of evaporative fuel circulated from the fuel tank to the filler neck is increased or decreased in accordance with increase or decrease of the internal pressure of the filler neck at a location close to the filler neck-side open end of the vent circulation passage, to thereby keep the internal pressure of the filler neck within the predetermined pressure range. Thus, the dissipation of evaporative fuel during refueling is prevented.

More preferably, the control valve increases or decreases the effective area of the vent circulation passage in accordance with the internal pressure of the filler neck at a location close to and upstream of the position at which the vent circulation passage opens into the filler neck. In this case, the increase/decrease control for the effective area of the vent circulation passage is not affected by the evaporative fuel circulated from the fuel tank to the filler neck. As a result, the control of the circulation quantity of evaporative fuel, and accordingly, the control of the internal pressure of the filler neck during refueling, can be carried out with high accuracy, permitting the internal pressure of the filler neck to be reliably kept within the proper range.

The control valve preferably has a negative pressure chamber and an atmosphere chamber separated from each other by a diaphragm to which a valve member for opening and closing the vent circulation passage is coupled, the negative pressure chamber communicating with the filler neck at a location upstream of the position at which the vent circulation passage opens into the filler neck, and the atmosphere chamber communicating with the atmosphere. In this case, the open/close control for the vent circulation passage, and thus the control for the circulation quantity of evaporative fuel, can be performed based on the actual internal pressure of the filler neck, and also the influence of the circulating evaporative fuel upon the open/close control for the vent circulation passage can be eliminated. Accordingly, the internal pressure of the filler neck can be properly controlled, and the dissipation of evaporative fuel prevented.

More preferably, the control valve opens when the internal pressure of the filler neck is a negative pressure smaller than the atmospheric pressure by a predetermined pressure or more. In this case, evaporative fuel is circulated from the fuel tank to the filler neck before the internal pressure of the filler neck drops to an excessively low pressure, thereby suppressing the inflow of the outside air into the filler neck. Also, in the case of refueling from a feed gun having the autostop mechanism, undesired automatic stop of refueling due to erroneous operation of the autostop mechanism caused by backward flow of fuel can be prevented.

Preferably, in the fuel evaporative emission treatment systems according to the first to third aspects of the invention, a restrictor for reducing the opening area of a fuel inlet opening of the filler neck is arranged at the fuel inlet opening at a location upstream of the position at which the vent circulation passage opens into the filler neck. In this case, the aspiration induced by refueling is enhanced by the restrictor, and the internal pressure of the filler neck in the vicinity of the opening of the vent circulation passage is appropriately reduced. As a result, the outflow of evaporative fuel through the gap between the filler neck and the feed gun is suppressed. Also, the circulation of evaporative fuel from the fuel tank to the filler neck via the vent circulation passage is appropriately promoted, thus suppressing the inflow of the outside air into the filler neck.

The vent circulation passage preferably has a fuel tank-side end opening into the vent passage and communicates with the upper space of the fuel tank through the vent passage. In this case, the vent circulation passage need not be directly connected to the fuel tank. Consequently, a component part for connecting the vent circulation passage and the fuel tank is not required, making it possible to reduce the cost of the system. Also, in the case where the present invention is applied to an existing fuel evaporative emission treatment system, the system need not be drastically altered in design or remodeled.

Preferably, the vent circulation passage opens into the filler neck at a location upstream of the position where a spout of the feed gun inserted into the filler neck is situated. In this case, fuel supplied from the feed gun into the filler neck does not flow into the vent circulation passage, and the circulation of evaporative fuel to the fuel neck via the vent circulation passage is not hindered by the supply of fuel. Accordingly, the internal pressure of the filler neck can be reliably controlled by means of the circulating evaporative fuel.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

A fuel evaporative emission treatment system according to the present invention will be hereinafter described in detail with reference to the accompanying drawings.

Figure 1:
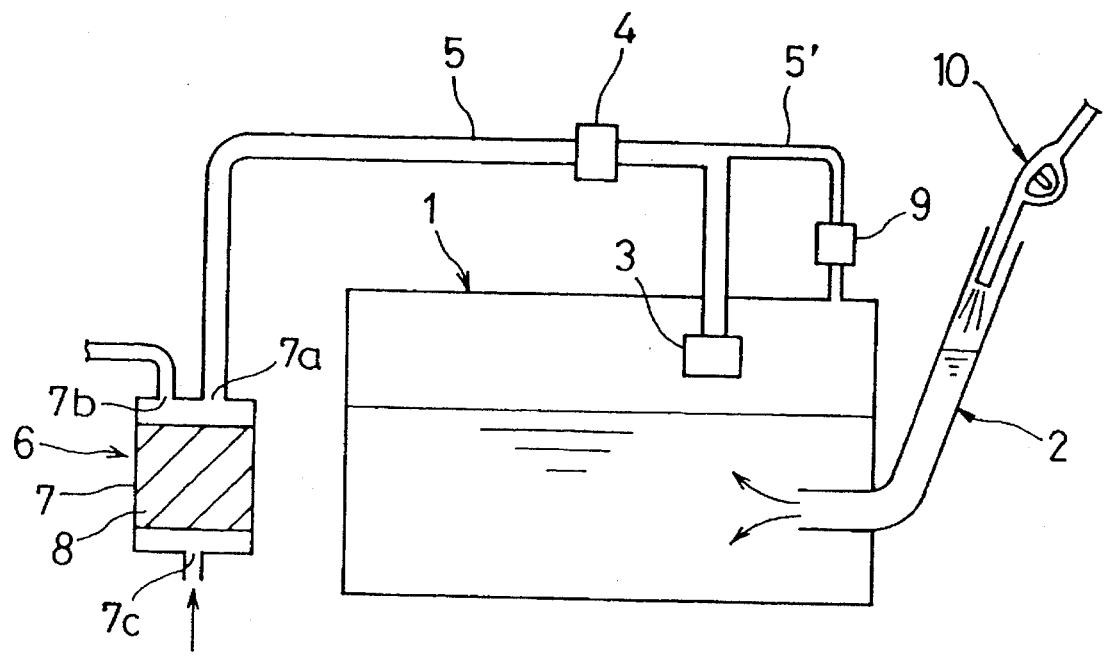
FIG. 1 is a schematic view of a conventional fuel evaporative emission treatment system.
Figure 4:
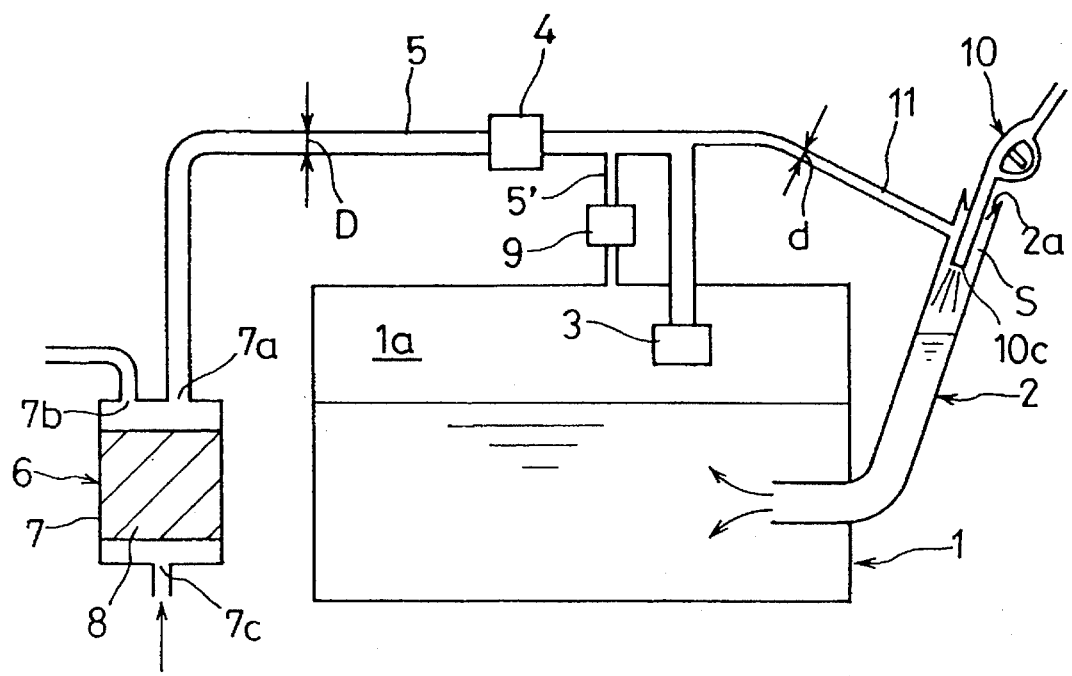
FIG. 4 is a schematic view of a fuel evaporative emission treatment system according to a first embodiment of the present invention.

FIG. 4 illustrates a fuel evaporative emission treatment system according to a first embodiment of the present invention, which is used in combination with a fuel system for an engine installed in a motor vehicle. The system of this embodiment has an arrangement basically identical to that of the conventional system shown in FIG. 1; therefore, like reference numerals are used to represent like component parts appearing in both systems, and description of such parts is omitted.

The system of this embodiment is designed to keep the internal pressure of a filler neck within a predetermined pressure range when fuel is supplied to a fuel tank of the fuel system, to suppress the outflow of evaporative fuel gas from the fuel tank 1 to the atmosphere, as well as the inflow of the outside air to the fuel tank 1, through the gap between the filler neck 2 and the feed gun 10, and thereby prevent the dissipation of evaporative fuel gas during refueling.

More specifically, evaporative fuel gas of positive pressure is circulated from an upper space 1a of the fuel tank 1 above the fuel level into the filler neck 2 so that the negative pressure produced due to the aspiration (suction) induced by refueling may be canceled out to a considerable degree by the positive pressure of the evaporative fuel Gas, to thereby achieve a proper internal pressure of the filler neck.

To this end, the fuel evaporative emission treatment system comprises a vent circulation hose 11 which functions as a vent circulation passage for circulating the evaporative fuel Gas from the fuel tank 1 to the filler neck 2. The vent circulation hose 11 has a fuel tank-side end opening in an intermediate portion of a vent hose 5 serving as a vent passage, and has the other end opening into the filler neck 2 at a location upstream of the position where a spout 10c of the feed gun 10 inserted into the filler neck 2 is situated. Accordingly, when the internal pressure of the filler neck 2 decreases as a result of the aspiration induced by refueling, part of the evaporative fuel gas in the upper space 1a of the fuel tank 1 flows into the filler neck 2 through the upstream portion of the vent hose 5 and the vent circulation hose 11, due to the difference in internal pressure between the fuel tank and the filler neck. The evaporative fuel gas in the filler neck 2 then flows into the fuel tank 1, together with fuel discharged from the feed gun 10, and evaporates in the upper space 1a of the fuel tank. Namely, the evaporative fuel gas circulates through the course of the upper space 1a of the fuel tank, the vent hose 5, the vent circulation hose 11, the filler neck 2, the fuel tank 1, and the upper space 1a of the fuel tank 1.

Figure 5:
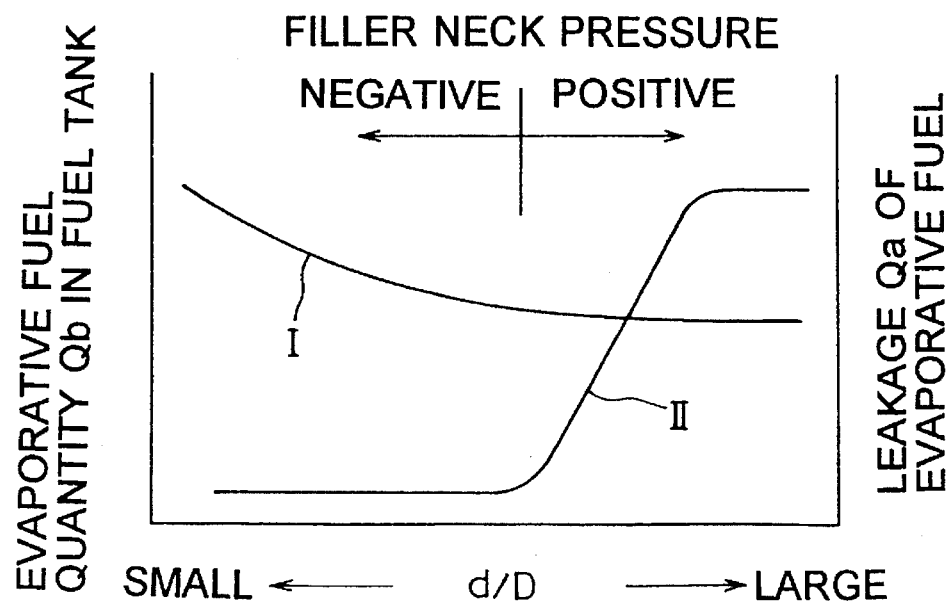
FIG. 5 is a graph showing the relationship between the ratio d/D of the inner diameter d of a vent circulation hose to the inner diameter D of a vent hose in the fuel evaporative emission treatment system shown in FIG. 4 and the leakage Qa of evaporative fuel to the atmosphere through a filler neck, as well as the relationship between the inner diameter ratio d/D and the quantity Qb of evaporative fuel in a fuel tank.

However, part of the evaporative fuel gas in the filler neck 2 can be dissipated into the atmosphere through the fuel inlet opening 2a of the filler neck 2. As indicated by curve II in FIG. 5, as the internal pressure of the filler neck becomes greater than the atmospheric pressure, a larger quantity of evaporative fuel gas leaks through the gap between the filler neck 2 and the feed gun 10. In FIG. 5, the internal pressure of the filler neck is indicated along the horizontal axis, and the quantity (leakage) Qa of evaporative fuel leaked is indicated along the vertical axis.

Also, as indicated by curve I in FIG. 5, as the internal pressure of the filler neck becomes smaller than the atmospheric pressure, a larger quantity of the outside air flows through the fuel inlet opening 2a into the filler neck 2 and then to the fuel tank 1, causing a large quantity of evaporative fuel gas to be produced in the fuel tank 1. In FIG. 5, the quantity Qb of evaporative fuel in the fuel tank 1 is indicated along the vertical axis.

The internal pressure of the filler neck is determined by the quantity of the positive-pressure evaporative fuel gas circulated from the fuel tank 1 to the filler neck 2 and the negative pressure produced due to the aspiration induced by refueling. The circulation quantity of the evaporative fuel and the aspiration-induced negative pressure are considered to change with time after the start of the fuel feed or refueling. Also, the aspiration-induced negative pressure is considered to vary depending on the fuel feed rate, the effective area of the gap between the filler neck 2 and the feed gun 10 at the fuel inlet opening 2a (corresponding to the inner diameter of the fuel inlet opening of the filler neck and the outer diameter of the feed gun), and other factors.

Provided the aspiration-induced negative pressure is substantially constant and the evaporative fuel gas is in a steady state such that it circulates through the aforementioned course, the ratio of the quantity of evaporative fuel introduced into the vent circulation hose 11 from the fuel tank 1 to the quantity of evaporative fuel introduced into the canister 6 from the fuel tank 1 through the vent hose 5 is a factor that determines the evaporative fuel circulation quantity, and accordingly, the internal pressure of the filler neck. In other words, the internal pressure of the filler neck varies depending on the ratio of the effective area (corresponding to the inner diameter d) of the vent circulation hose 11 to the effective area (corresponding to the inner diameter D) of the vent hose 5. Namely, the internal pressure of the filler neck rises with increase in the inner diameter ratio d/D, as shown in FIG. 5. In FIG. 5, the inner diameter ratio d/D is indicated along the horizontal axis.

In light of FIG. 5, to reduce the dissipation of evaporative fuel into the atmosphere, the internal pressure of the filler neck should desirably be kept at a value falling within a predetermined negative pressure range close to and smaller than the atmospheric pressure. Setting the internal pressure of the filler neck to such a proper negative pressure can be achieved by setting the inner diameter ratio d/D to an optimum value.

In this embodiment, the required conditions given below are set in order to achieve desirable relationship of the quantity of evaporative fuel introduced into the filler neck 2, the quantity of evaporative fuel introduced into the canister 6, and the quantity of the outside air flowing into the filler neck 2 (aspiration-induced negative pressure), and thereby set the internal pressure of the filler neck during refueling at a proper value.

(i) The inner diameter d of the vent circulation hose is smaller than the inner diameter D of the vent hose (d<D). In other words, the sectional area $S_d$ of the vent circulation hose is smaller than the sectional area $S_D$ of the vent hose.

(ii) The sectional area S of the gap between the filler neck 2 and the feed gun 10 is greater than the sectional area $S_d$ of the vent circulation hose (S>$S_d$)

(iii) The sectional area $S_D$ of the vent hose is greater than the sum of the sectional area S of the gap and the sectional area $S_d$ of the vent circulation hose ($S_D$>S +$S_d$)

More specifically, in this embodiment, where the outer diameter of the feed nozzle 10a of the feed gun 10 is 20 to 21 mm and the inner diameter of the fuel inlet opening 2a of the filler neck 2 is 22 mm, the inner diameter D of the vent hose and the inner diameter d of the vent circulation hose are set, respectively, to 14 mm and 5 mm. In this case, the sectional area $S_D$ (=$\pi D^2/4$) of the vent hose is about 154 mm$^2$, the sectional area $S_d$ of the vent circulation hose is about 20 mm$^2$, and the sectional area S of the gap is about 34 to 76 mm$^2$. The inner diameter ratio d/D is about 0.36.

In view of the fact that the aspiration effect is enhanced as the sectional area S of the gap decreases, the sectional area $S_d$ of the vent circulation hose is preferably set to a greater value for a smaller sectional area S of the gap.

The operation of the fuel evaporative emission treatment system of FIG. 4 will be now described.

First, the feed gun 10 is inserted into the filler neck 2 for refueling, and as fuel is fed into the fuel tank 1, it evaporates within the tank 1. The evaporative fuel is introduced into the vent hose 5, and part thereof flows into the filler neck 2 through the vent circulation hose 11 while the remaining part flows into the canister 6. The evaporative fuel introduced into the filler neck 2 flows into the fuel tank 1 together with fuel discharged from the feed gun 10. Namely, part of the evaporative fuel produced in the fuel tank 1 circulates through the course consisting of the vent circulation hose 11, the filler neck 2, and the fuel tank 1.

When fuel is discharged from the fuel gun 10, a negative pressure is produced inside the filler neck 2 due to aspiration induced by the discharge of fuel. On the other hand, the evaporative fuel flows into the filler neck 2 through the vent circulation hose 11, and thus lessens the magnitude of the aspiration-induced negative pressure. The internal pressure of the filler neck is determined by the quantity of the evaporative fuel circulating from the fuel tank 1 to the filler neck 2. The inner diameters d and D of the vent circulation hose and vent hose are set so that the inner diameter ratio (d/D) may be a suitable value, as mentioned above; therefore, a proper quantity of evaporative fuel circulates through the filler neck 2 and thus the internal pressure of the filler neck is kept at a suitable value, preferably, at a value close to the atmospheric pressure and smaller than the same by a suitable margin.

As a result, both the inflow of the outside air into the filler neck 2 through the gap between the filler neck 2 and the feed gun 10 and the dissipation of evaporative fuel gas from the filler neck 2 into the atmosphere through the same gap can be suppressed. Since the inflow quantity of the outside air is small, the quantity of evaporative fuel produced in the fuel tank 1 decreases, and thus the quantity of evaporative fuel flowing into the canister 6 also lessens. Consequently, the adsorption capacity (treating capacity) of the canister 6 may be low, permitting the size of the canister 6 to be reduced.

Figure 6:
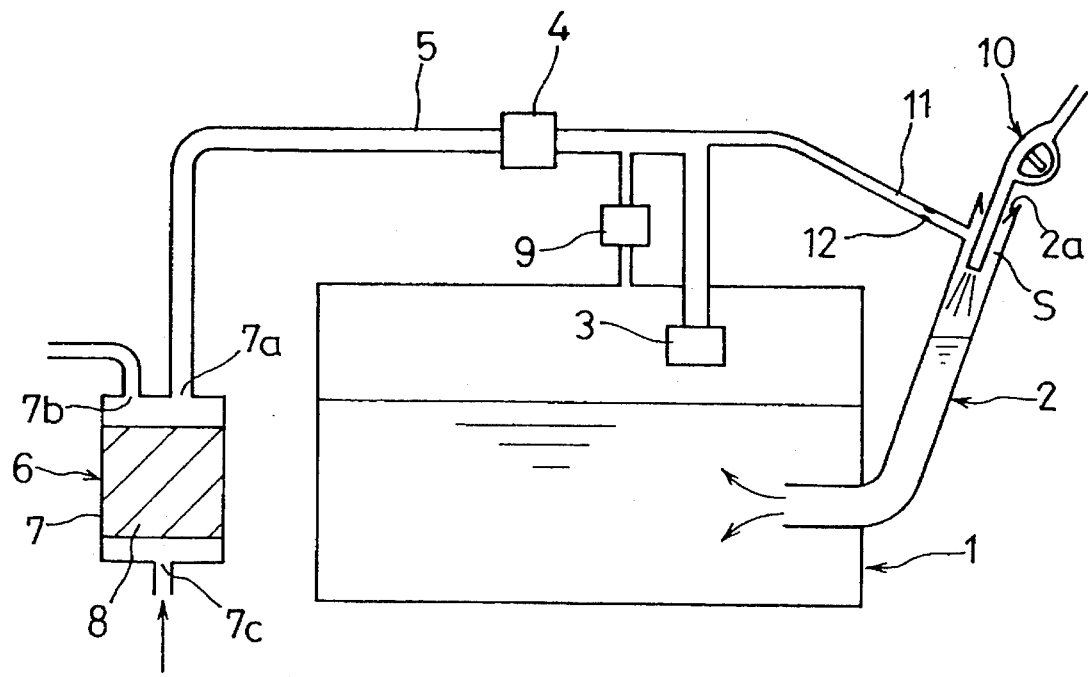
FIG. 6 is a schematic view of a fuel evaporative emission treatment system according to a second embodiment of the present invention.

Referring now to FIG. 6, a fuel evaporative emission treatment system according to a second embodiment of the present invention will be described.

The system of this embodiment is identical in basic arrangement to that of the system shown in FIG. 4 and differs therefrom in that an orifice 12 is provided in the middle of the vent circulation hose 11 serving as the vent circulation passage.

The orifice 12 serves to reduce the effective area of the vent circulation hose 11, and the quantity of evaporative fuel circulating from the fuel tank 1 to the filler neck 2, and accordingly, the internal pressure of the filler neck, vary depending on the opening area of the orifice 12 (i.e., the effective area of a portion of the vent circulation hose 11 where the orifice is provided). Specifically, if the opening area of the orifice 12 is too small, the internal pressure of the filler neck becomes a negative pressure excessively smaller than the atmospheric pressure. In this case, the inflow quantity of the outside air into the fuel tank 1 increases, increasing the quantity of evaporative fuel produced within the fuel tank 1. On the other hand, if the opening area of the orifice 12 is too large, then the internal pressure of the filler neck becomes excessively larger than the atmospheric pressure, causing a large quantity of evaporative fuel to leak from the filler neck 2 into the atmosphere. Therefore, the opening area of the orifice 12 is set to a proper value, in order to obtain a proper internal pressure of the filler neck.

The proper range for the opening area of the orifice 12 varies depending on the fuel feed rate. Specifically, the greater the fuel feed rate, the more conspicuous the aspiration effect caused by the discharge of fuel becomes, increasing the absolute value of the aspiration-induced negative pressure. Accordingly, as the fuel feed rate increases, less evaporative fuel introduced into the filler neck 2 from the vent circulation hose 11 is liable to leak into the atmosphere, and more outside air is liable to flow into the filler neck 2.

To obtain the proper range for the opening area of the orifice 12, the air inflow rate at a fuel feed rate (minimum feed rate) of 15 liters/minute was measured for the inner diameters 2, 3, 4, 5 and 6 mm of the orifice 12, and also the air inflow rate at a fuel feed rate of 38 lit/min was measured for the inner diameters 3, 5 and 6 mm of the orifice. For the measurement, a vent circulation hose 11 having an inner diameter of about 14 mm was used.

Figure 7:
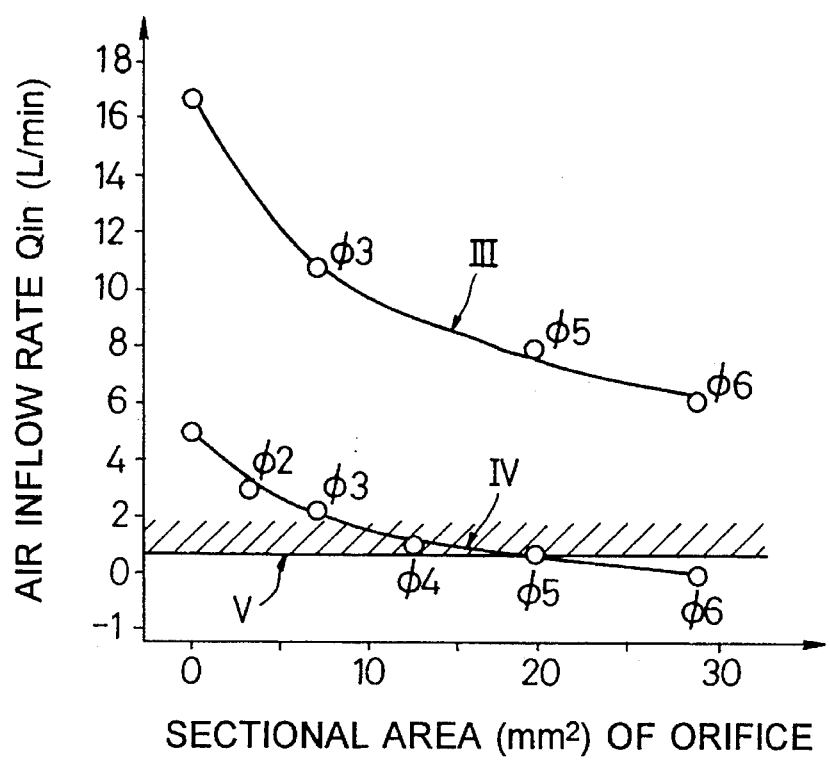
FIG. 7 is a graph showing the relationship of the fuel feed rate, the sectional area of an orifice in the vent circulation hose, and the air inflow rate, in the fuel evaporative emission treatment system shown in FIG. 6.

The measurement results are shown in FIG. 7, in which are plotted orifice sectional area ($mm^2$)-air inflow rate Qin (lit/min) characteristic curves III and IV. The characteristic curve III indicates the results obtained at the fuel feed rate 38 lit/min, and the characteristic curve IV indicates the results obtained at the fuel feed rate 15 lit/min. In FIG. 7, straight line V indicates the lower-limit air inflow rate which is determined taking account of the pulsation of inflow air during refueling and at which no evaporative fuel dissipates into the atmosphere.

In FIG. 7, the point of intersection between the characteristic curve IV and the straight line V represents the upper limit value for the inner diameter of the orifice 12 at which no dissipation of evaporative fuel occurs during the refueling at the minimum fuel feed rate 15 lit/min. Namely, the upper limit for the inner diameter of the orifice is about 5 mm.

Further, the quantity of evaporative fuel produced in the fuel tank at the fuel feed rate 15 lit/min was measured for the inner diameters 3, 5 and 6 mm of the orifice, and also the quantity of evaporative fuel produced in the tank at the fuel feed rate 38 lit/min was measured for the inner diameters 3, 5 and 6 mm of the orifice.

Figure 8:
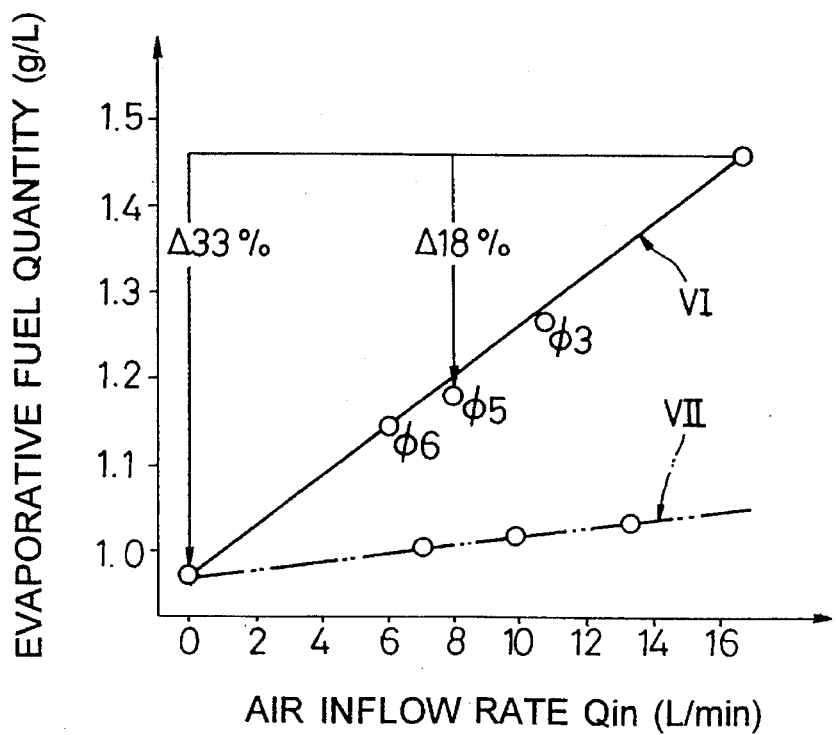
FIG. 8 is a graph showing the relationship of the fuel feed rate, the air inflow rate, the quantity of evaporative fuel, in the fuel evaporative emission treatment system shown in FIG. 6.

The measurement results are shown in FIG. 8, in which are plotted air inflow rate Qin (lit/min)-evaporative fuel quantity (grams/liter) characteristic lines VI and VII. The characteristic line VI indicates the results obtained at the fuel feed rate 38 lit/min, and the characteristic line VII indicates the results obtained at the fuel feed rate 15 lit/min.

As seen from FIG. 8, in the case where the orifice 12 with an inner diameter of 5 mm, for example, is provided in the vent circulation hose 11 and fuel is fed at a rate of 38 lit/min, the quantity of evaporative fuel produced in the fuel tank is smaller by about 18% than in the case where the inner diameter of the orifice is 0 mm, that is, the vent circulation hose 11 is closed up. The size of the canister to be used is in proportion to the quantity of evaporative fuel produced; therefore, in this case, the size of the canister can be reduced by about 18%.

Figure 3:
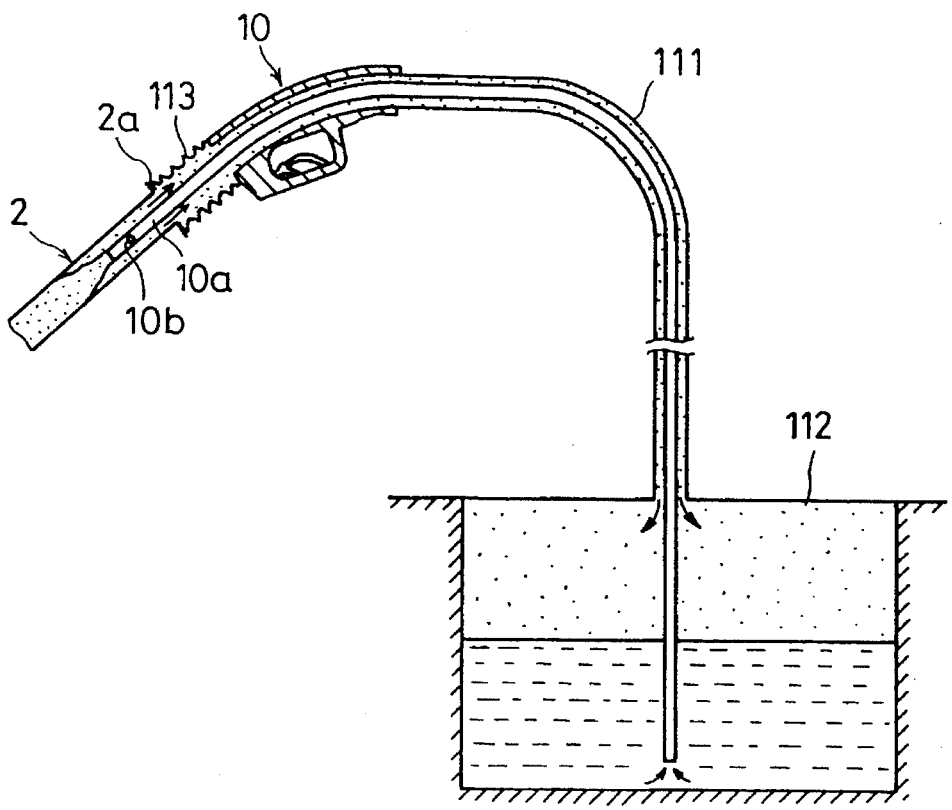
FIG. 3 is a schematic view of an evaporative fuel suction-type refueling system.
Figure 9:
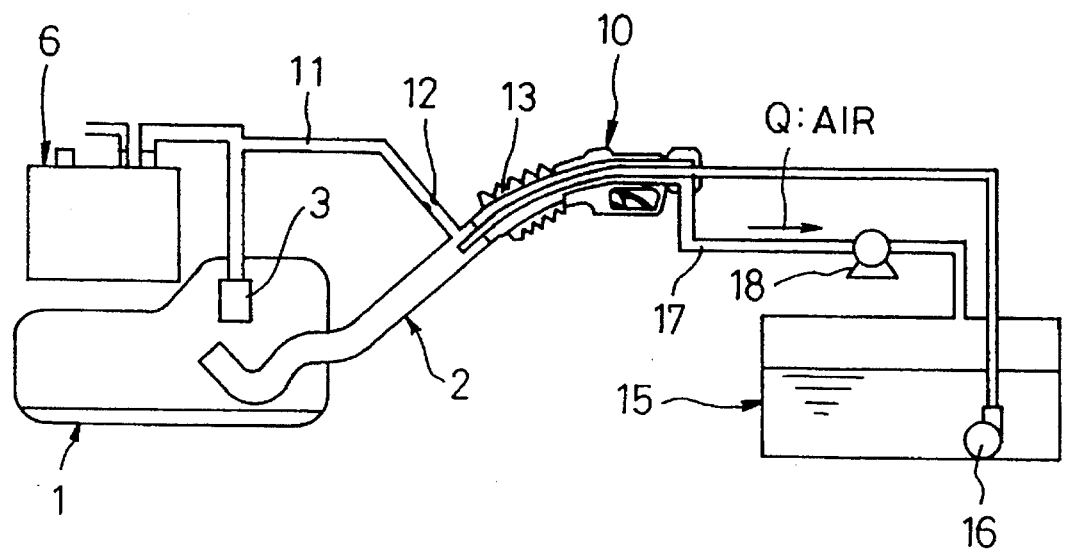
FIG. 9 is a schematic view showing the fuel evaporative emission treatment system of FIG. 6, along with an evaporative fuel suction-type refueling system.

FIG. 9 illustrates a refueling system having a gasoline vapor recovery function, similar to the refueling system shown in FIG. 3, along with the fuel evaporative emission treatment system of FIG. 6. In the illustrated refueling system, gasoline is fed from an underground tank 15 to the feed gun 10 by a feed pump 16, and gasoline vapor produced in the filler neck 2 during refueling is sucked through a passage 13 in the feed gun 10 and a hose 17 into the tank 15 by a suction pump 18, thus forcibly recovering the gasoline vapor. Accordingly, the gasoline vapor is prevented from dissipating into the atmosphere.

However, while gasoline is fed from such a refueling system to a fuel system with conventional arrangement, smooth supply of gasoline to the fuel tank 1 can be hindered when the gasoline vapor in the filler neck 2 is forcibly sucked by the suction pump 18. In such cases, the autostop mechanism (not shown) provided at the distal end of the feed gun 10 may be actuated due to contact with gasoline, with the result that the refueling is automatically stopped at an undesired time.

With the fuel system provided with the fuel evaporative emission treatment system of FIG. 6 in which the inner diameter of the orifice 12 in the vent circulation passage 11 is suitably set, fuel can be smoothly fed from this type of refueling system. Specifically, in the system of FIG. 6, positive-pressure evaporative fuel is circulated from the fuel tank 1 to the filler neck 2, and therefore, the internal pressure of the filler neck 2 does not become too large on the negative side even when the evaporative fuel is sucked by the suction pump 18. Accordingly, the situation where the refueling is automatically stopped at an undesired time due to contact of gasoline with the autostop mechanism of the feed gun 10 before the fuel tank 1 is filled with fuel is prevented.

In order to ascertain the required conditions for ensuring smooth supply of fuel from the refueling system having the aforementioned gasoline vapor recovery function to the fuel system provided with the fuel evaporative emission treatment system of FIG. 6, the internal pressure of the filler neck was measured with the fuel feed rate set to different values, using a combination of the system of FIG. 6 in which the orifice was 5 mm in inner diameter and the above refueling system. Also, the inner pressure of the filler neck was measured in the case where the inner diameter of the orifice was 0 mm.

Figure 10:
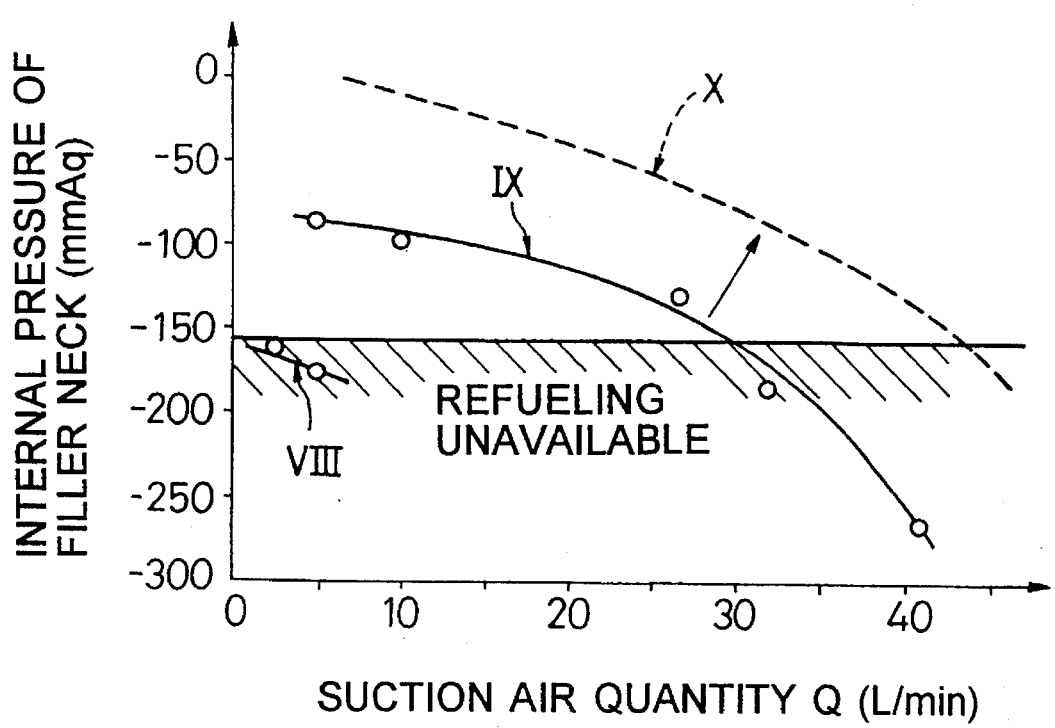
FIG. 10 is a graph showing the relationship of the inner diameter of the orifice, the quantity of suction air, and the internal pressure of the filler neck, in the case where the fuel evaporative emission treatment system and the refueling system are combined as shown in FIG. 9.

The measurement results are shown in FIG. 10, in which are plotted suction air quantity-filler neck internal pressure characteristic curves VIII and IX. The characteristic curve IX indicates the results obtained in the case where the inner diameter of the orifice 12 in the vent circulation hose 11 was set to 5 mm, and the characteristic curve VIII indicates the results obtained in the case where the inner diameter of the orifice was 0 mm.

FIG. 10 reveals that, where the suction air quantity of the suction pump 18 is smaller than or equal to 30 lit/min, no excessive negative pressure is produced within the filler neck insofar as the inner diameter of the orifice 12 is 5 mm or more. If the inner diameter of the orifice 12 is greater than 5 mm, the characteristic curve will presumably be like the one indicated by X. Namely, with a fuel system provided with the system of FIG. 6 in which the inner diameter of the orifice is set to a greater value, fuel can be smoothly supplied from a refueling system with the gasoline vapor recovery function of which the suction air quantity of the suction pump is large.

Figure 11:
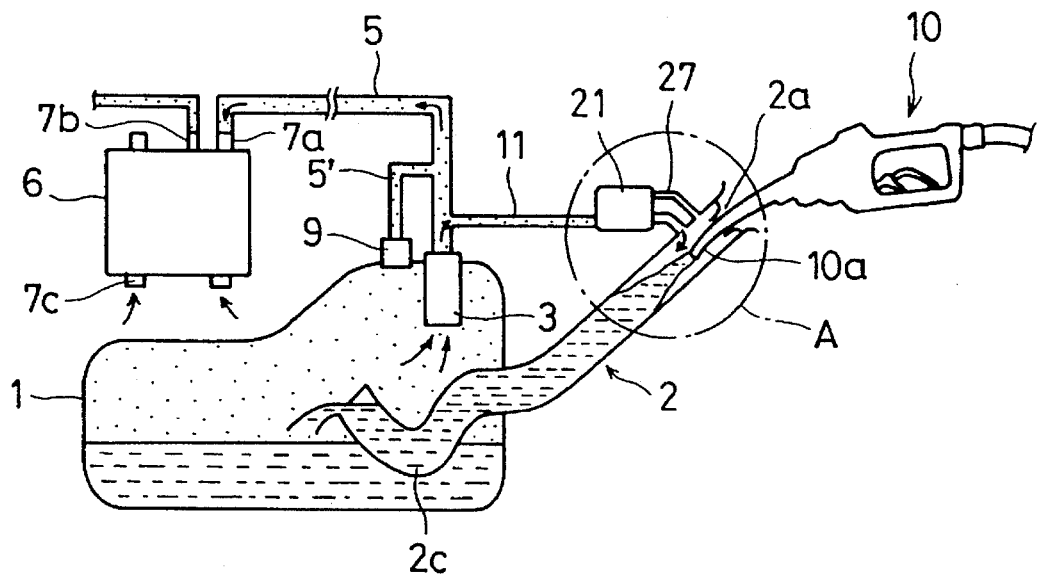
FIG. 11 is a schematic view of a fuel evaporative emission treatment system according to a third embodiment of the present invention.
Figure 12:
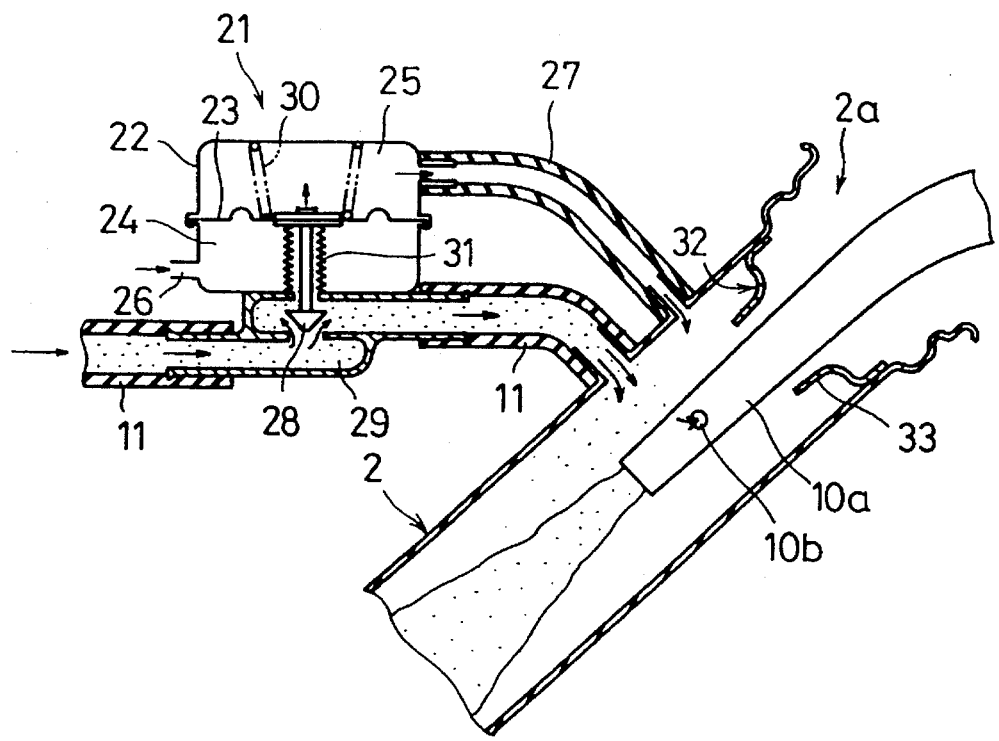
FIG. 12 is an enlarged sectional view of part A in FIG. 11.

Referring now to FIGS. 11 and 12, a fuel evaporative emission treatment system according to a third embodiment of the present invention will be described.

Figure 2:
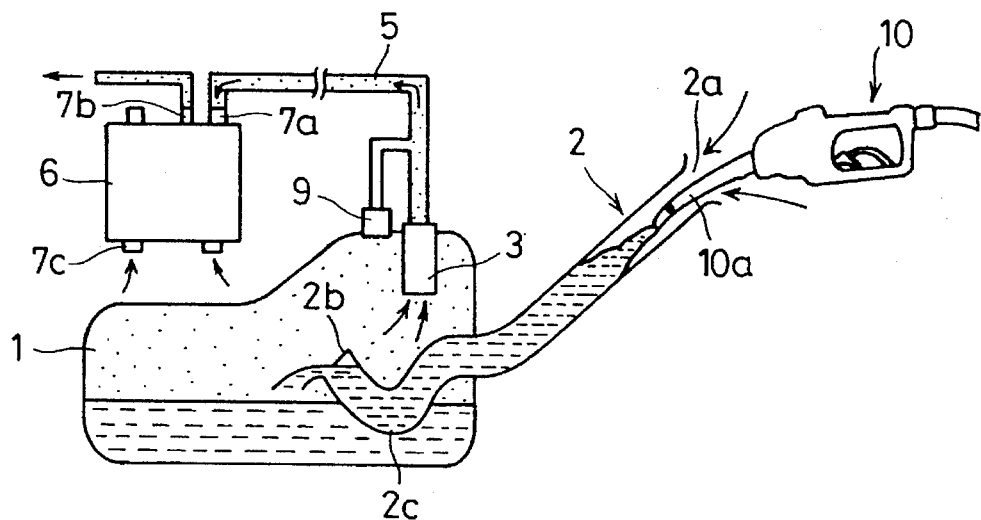
FIG. 2 is a schematic view of another conventional fuel evaporative emission treatment system equipped with an ORVR system.

Basically, the system of this embodiment is identical in arrangement to that shown in FIG. 2; therefore, like reference numerals are used to denote like elements appearing in both systems and description thereof is partly omitted.

As shown in FIG. 11, the fuel tank 1 and the fuel supply pipe (filler neck) 2 are formed as a one-piece body, the filler neck 2 having a bend 2c formed at a lower end portion thereof for storing fuel. The fuel-cut valve 3 is mounted to the upper surface of the fuel tank 1, and projects into the upper space 1a of the tank 1 so as to delimit the highest level of fuel and also to prevent leak of fuel in case of rollover. The fuel-cut valve 3 is connected to the vent hose 5, through which the fuel tank 1 communicates with the canister 6 arranged in the engine room. In FIG. 11, reference numeral 9 represents a two-way valve, which opens when the fuel-cut valve 3 closes and thus the internal pressure of the fuel tank 1 rises, to thereby permit evaporative fuel gas to be introduced into the canister 6 through a vent hose 5' connected to the vent hose 5.

In this embodiment, one end of the vent circulation hose 11 is connected to the upstream side of the vent hose 5, and the other end of the hose 11 is connected to a portion of the filler neck 2 in the vicinity of the fuel inlet opening 2a, via a flow rate control valve 21 serving as flow area control means. As shown in FIG. 12 which is an enlarged view of part A in FIG. 11, the flow rate control valve 21 has an atmosphere chamber 24 and a negative pressure chamber 25 formed within a valve body 22 and separated from each other by a diaphragm 23. The atmosphere chamber 24 communicates with the atmosphere through an atmosphere port 26, and the negative pressure chamber 25 communicates with the filler neck 2 at a location upstream of the junction of the filler neck 2 and the vent circulation hose 11 through a negative pressure hose 27. A valve member 28 is securely fixed to a central portion of the bottom surface of the diaphragm 23, and upward or downward movement of this valve member 28 opens or closes a circulation passage 29 communicating with the vent circulation hose 11. In the figure, reference numeral 30 denotes a spring for pressing the diaphragm 23 in a direction to close the valve member 28, and 31 denotes bellows for shutting the circulation passage 29 off from the atmosphere chamber 24.

A restrictor 32 for reducing the opening area of the inlet opening 2a is formed integrally with the filler neck 2 at a location close to the opening 2a. At the time of refueling, the feed nozzle 10a of the feed gun 10 is inserted through a restricted part 33 of the restrictor 32. At this time, the distal end of the feed nozzle 10a is situated at a location lower than the junction of the filler neck 2 and the vent circulation hose 11. A suction hole 10b of a fuel feed stop sensor, not shown, is formed in the feed nozzle 10a, and when the suction hole 10b becomes unable to suck gas therethrough, the refueling is automatically stopped.

The operation of the system according to this embodiment will be now described.

As refueling is started with the feed nozzle 10a inserted into the filler neck 2, evaporative fuel gas accumulated in the fuel tank 1 is introduced into the canister 6 through the fuel-cut valve 3 and the vent hose 5. At this time, air surrounding the feed nozzle 10a of the feed gun 10 is sucked into the filler neck 2 together with fuel due to aspiration caused by the refueling, and thus a negative pressure is produced around the feed nozzle 10 also thanks to the effect of the restrictor 32. As a result, the negative pressure chamber 25 of the flow rate control valve 21 is evacuated through the negative pressure hose 27. Thus, the internal pressure of the negative pressure chamber 25 lowers, and when the differential pressure between the negative pressure chamber 25 and the atmosphere chamber 24 becomes greater than the urging force of the spring 30, the diaphragm 23 starts to rise. Since the valve member 28 is secured to the diaphragm 23, the valve member 28 and the diaphragm 23 move upward as a unit, whereby the circulation passage 29 opens by degrees.

Consequently, the fuel evaporative gas flowing in the vent hose 5 is introduced into the filler neck 2 through the vent circulation hose 11, and fuel evaporative gas, instead of air, is sucked into the filler neck 2. Accordingly, generation of extra evaporative gas attributable to the inflow of the outside air into the fuel tank 1 is suppressed, and overflow of the fuel evaporative gas from the atmosphere port 7c of the canister 6 does not occur even in the case where the canister 6 used has a relatively small capacity. In the flow rate control valve 21, the lift of the valve member 28 (i.e., the opening of the flow rate control valve 21) varies depending on the internal pressure of the negative pressure chamber 25. Therefore, as the internal pressure of the negative pressure chamber 25 lowers with decrease in the internal pressure of the filler neck 2, the opening of the control valve 21 increases to compensate for the decrease in the internal pressure of the filler neck. Consequently, the region surrounding the feed nozzle 10a is never subjected to a negative pressure having an excessively large absolute value, and fuel feed stop attributable to adhesion of fuel to or insufficient intake of gas into the suction hole 10b of the fuel feed stop sensor does not occur.

In the case of refueling from the refueling system (FIG. 3) having the fuel evaporative gas suction function, when the absolute value of the negative pressure in the filler neck 2 increases, the opening of the flow rate control valve 21 increases, thereby increasing the amount of fuel evaporative gas introduced into the filler neck 2. Thus, during refueling by means of this type of refueling system, the region surrounding the feed nozzle 10a is never subjected to a negative pressure having an excessively large absolute value, and fuel feed stop attributable to adhesion of fuel to or insufficient intake of gas into the suction hole 10b of the fuel feed stop sensor does not occur. In the system of this embodiment, the pressure-receiving areas of the diaphragm 23 and the force of the spring 30 are set to values such that the region surrounding the feed nozzle 10a is subjected to slightly negative pressure during refueling; therefore, the dissipation of evaporative fuel gas can be perfectly eliminated, though a small quantity of air may be sucked in from the fuel inlet opening 2a.

The present invention is not limited to the first to third embodiments described above and various modifications may be made.

For example, in the third embodiment, a negative pressure-operated type flow rate control valve is used as the flow area control means, but it may be replaced with a combination of a negative pressure sensor and an electric operated valve, etc. Further, the vent circulation passage may be connected directly to the fuel tank, instead of being connected to the vent passage so as to diverge therefrom, and the restricting means such as the restrictor may be omitted.

Furthermore, the features of the systems of the first to third embodiments may be combined in various ways.

Since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A fuel evaporative emission treatment system for use with an engine fuel system including a fuel tank having a filler neck, the fuel tank having an upper space defined therein above the level of fuel contained therein, the system comprising:

a canister for adsorbing evaporative fuel produced in the fuel system;

a vent passage connecting the upper space of the fuel tank and said canister, said vent passage having a first effective area; and a vent circulation passage connecting the upper space of the fuel tank and the filler neck, said vent circulation passage having a second effective area, the ratio of the second effective area to the first effective area being set to a value such that internal pressure of the filler neck during refueling falls within a predetermined pressure range, and the second effective area being smaller than the first effective area.

2. A fuel evaporative emission treatment system for use with an engine fuel system including a fuel tank having a filler neck, the fuel tank having an upper space defined therein above the level of fuel contained therein, the system comprising:

a canister for adsorbing evaporative fuel produced in the fuel system;

a vent passage connecting the upper space of the fuel tank and said canister, said vent passage having a first effective area;

a vent circulation passage connecting the upper space of the fuel tank and the filler neck; and an orifice formed in said vent circulation passage for reducing the effective area thereof, a portion of said vent circulation passage at which said orifice is formed having a second effective area, the ratio of the second effective area to the first effective area being set to a value such that internal pressure of the filler neck during refueling falls within a predetermined pressure range.

3. The fuel evaporative emission treatment system according to claim 2, wherein the second effective area is smaller than the first effective area.

4. The fuel evaporative emission treatment system according to claim 1 or 2, wherein the second effective area is smaller than the effective area of a gap between the filler neck and a feed gun inserted into the filler neck.

5. The fuel evaporative emission treatment system according to claim 1 or 2, wherein the first effective area is greater than the sum of the second effective area and the effective area of a gap between the filler neck and a feed gun inserted into the filler neck.

6. The fuel evaporative emission treatment system according to claim 1 or 2, wherein the ratio of the second effective area to the first effective area is set to a value such that the internal pressure of the filler neck during refueling is close to atmospheric pressure.

7. The fuel evaporative emission treatment system according to claim 1 or 2, wherein the ratio of the second effective area to the first effective area is set to a value such that the internal pressure of the filler neck during refueling is smaller than atmospheric pressure.

8. The fuel evaporative emission treatment system according to claim 1 or 2, wherein the ratio of the second effective area to the first effective area is set to a value such that the internal pressure of the filler neck during refueling is close to and smaller than atmospheric pressure.

9. The fuel evaporative emission treatment system according to claim 1 or 2, wherein the second effective area is set to a value such that the flow rate of air sucked in from the gap between the filler neck and a feed gun inserted into the filler neck is close to zero during refueling at a minimum fuel feed rate.

10. The fuel evaporative emission treatment system according to claim 1 or 2, wherein the second effective area is set to a value such that the flow rate of air sucked in from the gap between the filler neck and a feed gun inserted into the filler neck is greater than zero during refueling at a minimum fuel feed rate.

11. The fuel evaporative emission treatment system according to claim 1 or 2, wherein the second effective area is set to a value such that the flow rate of air sucked in from the gap between the filler neck and a feed gun inserted into the filler neck is close to and greater than zero during refueling at a minimum fuel feed rate.

12. The fuel evaporative emission treatment system according to claim 1 or 2, wherein the second effective area is smaller than or equal to 30 $mm^2$.

13. A fuel evaporative emission treatment system for use with an engine fuel system including a fuel tank having a filler neck, the fuel tank having an upper space defined therein above the level of fuel contained therein, the system comprising:

a canister for adsorbing evaporative fuel produced in the fuel system;

a vent passage connecting the upper space of the fuel tank and said canister;

a vent circulation passage connecting the upper space of the fuel tank and the filler neck; and a control valve arranged in said vent circulation passage for varying the effective area thereof.

14. The fuel evaporative emission treatment system according to claim 13, wherein said control valve increases or decreases the effective area of said vent circulation passage in accordance with internal pressure of the filler neck at a location close to a position at which said vent circulation passage opens into the filler neck.

15. The fuel evaporative emission treatment system according to claim 13, wherein said control valve increases or decreases the effective area of said vent circulation passage in accordance with internal pressure of the filler neck at a location close to and upstream of a position at which said vent circulation passage opens into the filler neck.

16. The fuel evaporative emission treatment system according to claim 13, wherein said control valve has a negative pressure chamber and an atmosphere chamber separated from each other by a diaphragm to which a valve member for opening and closing said vent circulation passage is coupled, the negative pressure chamber communicating with the filler neck at a location upstream of a position at which said vent circulation passage opens into the filler neck, and the atmosphere chamber communicating with atmosphere.

17. The fuel evaporative emission treatment system according to any one of claims 13 through 16, wherein said control valve opens when internal pressure of the filler neck is a negative pressure smaller than atmospheric pressure by a predetermined pressure or more.

18. The fuel evaporative emission treatment system according to any one of claims 1 or 13, which further comprises a restrictor for reducing the opening area of a fuel inlet opening of the filler neck, the restrictor being arranged at the fuel inlet opening at a location upstream of a position at which said vent circulation passage opens into the filler neck.

19. The fuel evaporative emission treatment system according to any one of claims 1 or 13, wherein said vent circulation passage has a fuel tank-side end opening into said vent passage and communicates with the upper space of the fuel tank through said vent passage.

20. The fuel evaporative emission treatment system according to any one of claims 1 or 13, wherein said vent circulation passage opens into the filler neck at a location upstream of a position where a spout of the feed gun inserted into the filler neck is situated.

* * * * *